(12) United States Patent
Tystad et al.

(10) Patent No.: US 10,757,143 B2
(45) Date of Patent: Aug. 25, 2020

(54) NOTIFYING CHANGES IN RADIO ACCESS TECHNOLOGY

(71) Applicant: Telefonaktiebolaget LM Ericsson (publ), Stockholm (SE)

(72) Inventors: Fredrik Tystad, Saltsjö Boo (SE); Jan Dahl, Älvsjö (SE); Leif Gustavsson, Stockholm (SE); Jan Holm, Stora Skedvi (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 177 days.

(21) Appl. No.: 15/765,067

(22) PCT Filed: Oct. 8, 2015

(86) PCT No.: PCT/EP2015/073316
§ 371 (c)(1),
(2) Date: Mar. 30, 2018

(87) PCT Pub. No.: WO2017/059919
PCT Pub. Date: Apr. 13, 2017

(65) Prior Publication Data
US 2019/0052679 A1 Feb. 14, 2019

(51) Int. Cl.
H04L 12/24 (2006.01)
H04L 12/751 (2013.01)
(Continued)

(52) U.S. Cl.
CPC ...... H04L 65/1006 (2013.01); H04L 65/1016 (2013.01); H04L 65/1069 (2013.01);
(Continued)

(58) Field of Classification Search
CPC ............. H04L 65/1006; H04L 65/1073; H04L 65/1016; H04L 65/1069; H04L 65/105; H04L 65/40; H04L 56/10; H04M 15/66
See application file for complete search history.

(56) References Cited

U.S. PATENT DOCUMENTS

2007/0064709 A1* 3/2007 Holmstrom ......... H04L 65/1006
370/395.2
2009/0168726 A1* 7/2009 Thalanany ........ H04W 36/0011
370/332
(Continued)

FOREIGN PATENT DOCUMENTS

CN 101472302 A 7/2009
CN 104335544 A 2/2015
(Continued)

OTHER PUBLICATIONS

International Search Report and Written Opinion of the International Searching Authority, PCT/EP2015/073316, dated Jun. 17, 2016, 10 pages.
(Continued)

Primary Examiner — Brian S Roberts
Assistant Examiner — Abusayeed M Haque
(74) Attorney, Agent, or Firm — Sage Patent Group

(57) ABSTRACT

A method of notifying one or more network nodes in a communications network, comprising an Internet Protocol Multimedia Subsystem, IMS, of a change in RAT used by a user equipment for a communications session, the method comprising at a CSCF prior to set-up of the communications session, indicating by the CSCF to a PCRF that the CSCF requires RAT change notifications for the user equipment, providing a capability indication by the CSCF to the one or more network nodes that the CSCF supports RAT change notifications and receiving from at least one of the one or more network nodes a requirement indication, which indi-
(Continued)

cates that the network node requires RAT change notifications. The method further comprises on receipt of a RAT change notification by the CSCF propagating the RAT change notification to each of the nodes from which a requirement indication has been received.

24 Claims, 6 Drawing Sheets

(51) Int. Cl.
*H04L 29/06* (2006.01)
*H04M 15/00* (2006.01)

(52) U.S. Cl.
CPC ........ *H04L 65/1073* (2013.01); *H04M 15/66* (2013.01); *H04L 65/105* (2013.01)

(56) References Cited

U.S. PATENT DOCUMENTS

| | | | | |
|---|---|---|---|---|
| 2010/0128694 A1* | 5/2010 | Choi-Grogan | .... | H04W 36/0027 370/331 |
| 2010/0312832 A1* | 12/2010 | Allen | .................. | H04L 65/1016 709/204 |
| 2010/0312897 A1* | 12/2010 | Allen | ...................... | H04L 65/80 709/227 |
| 2011/0040836 A1* | 2/2011 | Allen | .................. | H04L 65/1093 709/205 |
| 2013/0190027 A1* | 7/2013 | Cao | ................... | H04W 52/0206 455/509 |
| 2014/0195607 A1* | 7/2014 | Kowalewski | ....... | H04L 65/1016 709/204 |
| 2014/0293838 A1 | 10/2014 | Lim et al. | | |
| 2016/0073284 A1* | 3/2016 | Qian | ................. | H04W 52/0229 370/241 |
| 2016/0156544 A1* | 6/2016 | Holm | ...................... | H04L 45/02 370/389 |
| 2016/0295390 A1* | 10/2016 | Gonzalez De Langarica | .............. | H04L 67/16 |

FOREIGN PATENT DOCUMENTS

| | | |
|---|---|---|
| WO | WO 2010/112759 A1 | 10/2010 |
| WO | WO 2010112759 A1 * 10/2010 | ............. H04L 29/06 |
| WO | WO-2010112759 A1 * 10/2010 | ............ H04W 67/14 |

OTHER PUBLICATIONS

"Technical Specification Group Core Network and Terminals; Policy and Charging Control Over Rx Reference Point," (Release 13) 3GPP TS 29.214 V13.3.0 (Sep. 2015) XP050996195, 66 pages.
Chinese First Office Action and Search Report dated Jun. 1, 2020 for Chinese Patent Application No. 2015800837112, 14 pages.
"Network-Based Solution to Improve T-ADS in the SCC AS", 3GPP TSG SA WG2 Meeting #76, TD S2-096856; Nov. 16-20, 2009; San Jose Del Cabo, Mexico; 3 pages.

* cited by examiner

NOTIFYING CHANGES IN RADIO ACCESS TECHNOLOGY

CROSS REFERENCE TO RELATED APPLICATIONS

This application is a 35 U.S.C. § 371 national stage application of PCT International Application No. PCT/EP2015/073316 filed on Oct. 8, 2015, the disclosure and content of which is incorporated by reference herein in its entirety.

TECHNICAL FIELD

The present invention relates to notifying changes in Radio Access Technology.

BACKGROUND

The increasing availability of Wi-Fi capabilities in wireless devices such as smartphones combined with the free and wide unlicensed spectrum of Wi-Fi networks has led to an increasing use of offloading network traffic onto Wi-Fi networks. Early deployments of Voice over Wi-Fi calling for VoLTE users are now taking market presence.

The mobility of users means that moving between different Radio Access Technologies, RAT, within a single communications session is very common. A problem arises however in that certain parameters related to a communication session set up for on RAT are not optimal when the session is moved to another technology, in particular the codec and the charging regime.

Currently charging differentiation based on the access network used is limited to the type of network in which the call originates. There is no mechanism to apply charging differentiation based on access mobility between Wi-Fi, Long Term Evolution (LTE) and circuit switched legacy networks. This limitation applies to both on-line and off-line charging. There is also no mechanism to trigger a codec change in response to a RAT change.

A possible mechanism to change codec or charging regime would be for the user equipment to send a new Session Initiation Protocol (SIP) INVITE message upon the initiation of a RAT change. However, although this would provide a simple and effective mechanism, there are serious trust issues in allowing the user equipment to initiate a change in charging regime.

SUMMARY

Accordingly, in a first aspect of the present invention, there is provided an apparatus for use in a Call Session Control Function, CSCF in an IP Multimedia Subsystem, IMS, the apparatus comprising: processor circuitry, a storage unit storing instructions executable by said processor circuitry, a transmitter and a receiver, whereby the apparatus is operative, prior to the set-up of a communications session, to indicate to a Policy Charging and Rules Function, PCRF, that the CSCF requires RAT change notifications for a user equipment, to provide a capability indication to one or more network nodes that the CSCF supports RAT change notifications and to receive from the one or more network nodes a requirement indication, which indicates that the network node requires RAT change notifications. The apparatus is further operative, on receipt of a RAT change notification by the CSCF to propagate the RAT change notification to each of the one or more network nodes from which a requirement indication has been received.

In an embodiment, the apparatus is operative to perform one of indicating to the PCRF, providing of the capability notification, and receiving the requirement indication, at registration of the user equipment.

In an embodiment, the apparatus is operative to perform one of indicating to the PCRF, providing of the capability notification, and receiving the requirement indication, at establishment of the communications session.

In an embodiment, the apparatus is operative to provide the capability notification in one of a Session Initiation Session, SIP, REGISTER method and a Session Initiation Session, SIP, INVITE method.

In an embodiment, the apparatus is operative to receive the requirement indication by means of a SIP SUBSCRIBE method.

In an embodiment, the apparatus is operative to supply the RAT change notification by means of one of a SIP NOTIFY method, a SIP INFO method and SIP MESSAGE method.

In an embodiment, the apparatus is operative to process a feature-cap mechanism used to convey at least one of the requirement indication, the capability indication or the RAT change notification.

In a second aspect of the present invention there is provided a network node comprising an apparatus according to the first aspect.

In an embodiment, the network node comprises a Proxy Call Session Control Function, P-CSCF.

In a third aspect of the present invention there is provided an apparatus for use in a network node in a telecommunications network comprising an IP Multimedia Subsystem, IMS, the apparatus comprising: processor circuitry, a storage unit storing instructions executable by said processor circuitry, a transmitter and a receiver, wherein the apparatus is operative to receive a capability indication from a Call Session Control Function, CSCF, that the CSCF supports RAT change notifications for a user equipment and provide to the CSCF a requirement indication, which indicates that the network node requires RAT change notifications for the user equipment.

In an embodiment, the apparatus is further operative to perform a network operation in response to receiving RAT change notification.

In an embodiment the network operation is one of altering a charging scheme for the communications session, collecting statistics for the communications session, a service change and a codec change.

In a fourth aspect of the present invention there is provided a network node comprising an apparatus according to the third aspect.

In a fifth aspect of the present invention, there is provided a method of notifying one or more network nodes in a communications network, comprising an Internet Protocol Multimedia Subsystem, IMS, of a change in Radio Access Technology, RAT, used by a user equipment for a communications session. The method comprises at a Call Session Control Function, CSCF, prior to set-up of the communications session, indicating by the CSCF to a Policy Charging and Rules Function, PCRF, that the CSCF requires RAT change notifications for the user equipment, providing a capability indication by the CSCF to the one or more network nodes that the CSCF supports RAT change notifications and receiving from at least one of the one or more network nodes a requirement indication, which indicates that the network node requires RAT change notifications.

The method further comprises, on receipt of a RAT change notification by the CSCF, propagating the RAT change notification to each of the nodes from which a requirement indication has been received.

In an embodiment the CSCF is a Proxy Call Session Control Function, P-CSCF.

In an embodiment the method further comprises, at a network node, the step of performing a network operation in response to receiving RAT change notification.

In an embodiment the network operation is one of altering a charging scheme for the communications session, collecting statistics for the communications session, a service change and a codec change.

In an embodiment one or more of the steps of indicating to the PCRF, providing of the capability notification, and receiving the requirement indication is performed at registration of the user equipment.

In an embodiment one or more of the steps of indicating to the PCRF, providing of the capability notification, and receiving the requirement indication is performed at establishment of the communications session.

In an embodiment the capability notification is provided in one of a Session Initiation Session, SIP, REGISTER method and SIP INVITE method.

In an embodiment the requirement indication is received by means of a SIP SUBSCRIBE method.

In an embodiment the RAT change notification is supplied by means of one of: a SIP NOTIFY method, a SIP INFO method and a SIP MESSAGE method.

In an embodiment a feature-cap mechanism is used to convey at least one of the requirement indication, the capability indication or the RAT change notification.

In a sixth aspect of the present invention, there is provided a computer program, comprising instructions which, when executed on at least one processor, cause the at least one processor to carry out a method according to the fifth aspect.

In a seventh aspect of the present invention, there is provided a computer program product comprising a computer program according to the sixth aspect.

In an eighth aspect of the present invention, there is provided a carrier containing the computer program product according to the seventh aspect, wherein the carrier optionally includes an electrical signal, an optical signal, a radio signal, a magnetic tape or disk, an optical disk or a memory stick.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

Figure 1:
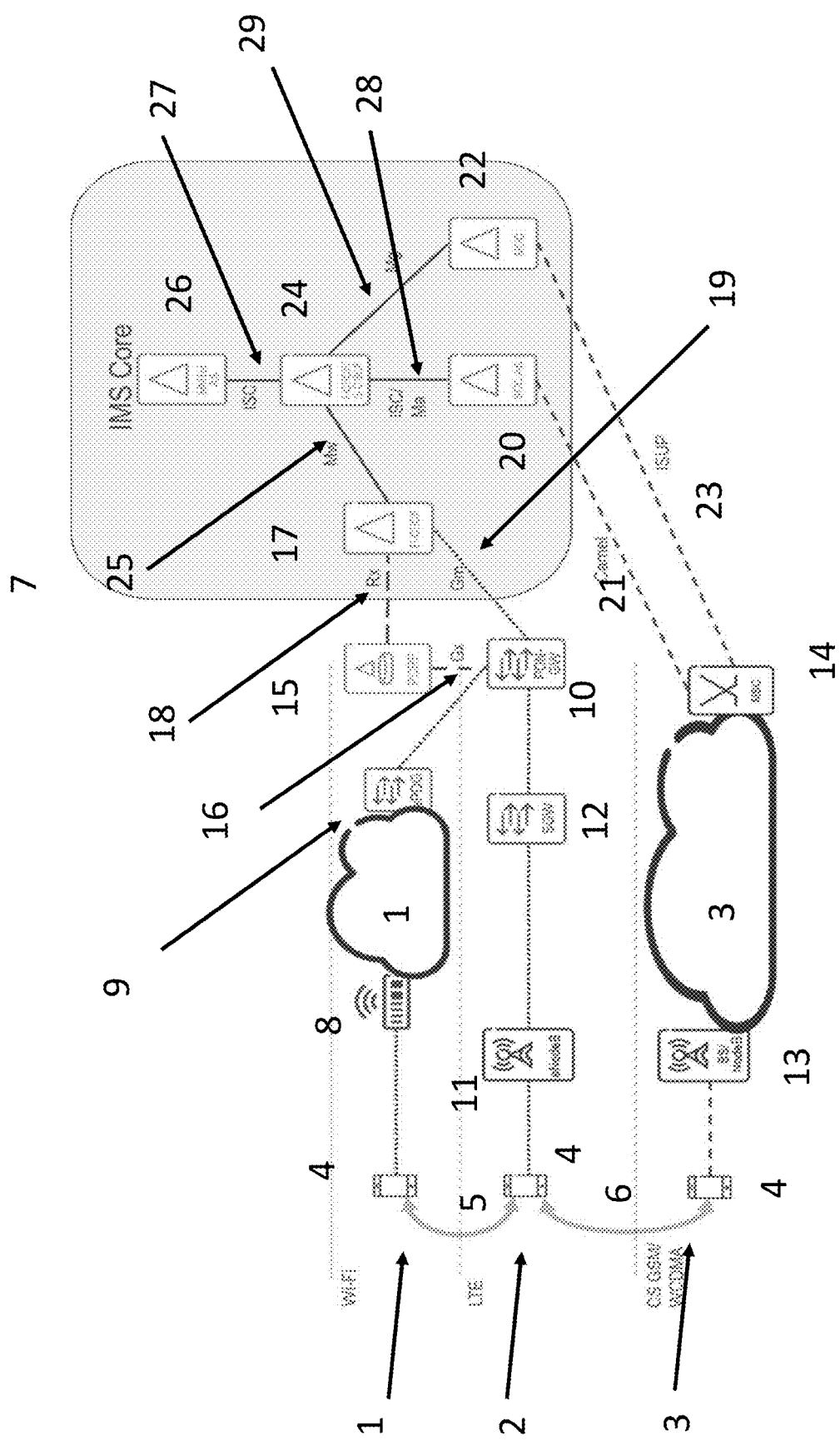
FIG. 1 is a schematic diagram of a typical IMS enabled telecommunications network.

FIG. 1 is a schematic diagram of a typical communications network on which the present invention may be implemented. The network comprises three access networks, a Wi-Fi network (1), a Long-term Evolution, LTE, access network (2) and a legacy circuit switched Global System for Mobile Communications/Wideband Code Division Multiple Access (GSM/WCDMA) access network (3). A user equipment (4) is illustrated, moving to and from (5) the LTE access network and (6) the GSM/WCDMA access network. The network further comprises an Internet Protocol (IP) Multimedia Subsystem (IMS) (7). When the user equipment is connected to the Wi-Fi network (1), it is linked to an access point (8), which provides access to the Wi-Fi network. The Wi-Fi network is in turn connected to the IMS (7) by means of an Evolved Packet Data Gateway (ePDG) (9) and Packet Data Network Gateway (PDN-GW) (10). When the user equipment is connected to the LTE access network (2), it is linked to eNodeB (11) and hence to the IMS by means of Serving Gateway (SGW) (12) and PDN-GW (10). When the user equipment is linked to a legacy GSM/WCDMA access network (3) it is linked to a base station/node B (13) and hence to the IMS by means of Mobile Switching Center (MSC) (14). If Customized Applications for Mobile networks Enhanced Logic (CAMEL) (21) is used, the link is to the Service Centralization and Continuity Application Server (SCC AS) (20). If Integrated Services Digital Network User Part (ISUP) (23) is used, the link is with a Media Gateway Controller MGC (22). The IMS core comprises Proxy Call Session Control Function (P-CSCF) (17), Serving Call Session Control Function (24), Application Servers (AS) (24), including the SCC AS (20) and the MGC (22). Finally, there is the Policy Charging and Rules Function (PCRF) (15), which is linked to the P-CSCF (17) via the Rx interface (18) and with the PDNGW (10) via the Gx interface (16). The PDNGW (10) is linked to the P-CSCF (17) and hence the IMS core by the Gm interface (19). The IMS core interfaces are the Mw interface (25) between the P-CSCF (17) and the S-CSCF (24), the ISC (27) between the S-CSCF (24) and the application servers (26), the ISC/Ma (28) between the S-CSCF (24) and the SCC AS (20) and the Mg interface between the S-CSCF (24) and the MGC (22).

The present invention seeks to overcome a problem in current systems in which it is not possible to change a codec or charging regime when a change in Radio Access Technology (RAT) takes place. It seeks to do this without relying on new signaling from the user equipment. A mechanism is provided for receiving at a Call Session Control Function an indication that a RAT change has taken place and propagating the indication through the core network to nodes for which this information is useful. In an embodiment the indication is received at the Proxy Call Session Control Function (P-CSCF). The indication is received from the Evolved Packet System (EPS). In an embodiment, this is received from a Policy Charging and Rules Function (PCRF). In an embodiment, the Packet Data Network Gateway (PGW) provides the indication of RAT change to the PCRF. The person skilled in the art will appreciate that other arrangements are possible and the invention is not limited to operation at one particular network node type or combination of network node types.

The principal uses of the RAT change indication are to change codecs and to change the charging regime. However, other uses may be made of the indication, such as the collection of mobility data or other service changes which may be available or required upon change of access network. The changes in charging regime may include changes when Wi-Fi mobility is used, i.e. different tariffs for Wi-Fi and LTE or for operator services such as private restaurant or Coffee house Wi-Fi or operator Wi-Fi networks. It also enables rerating of services mid-call in case of Single Radio Voice Call Continuity (SRVCC) or Dual Radio Voice Call Continuity (DRVCC). The charging system can be based on the received information and can make decisions like changing the tariff, releasing the call etc. The person skilled in the art will appreciate that there are many potential uses for the novel mechanism and the invention is not limited to any one use or combination of uses.

Figure 2:
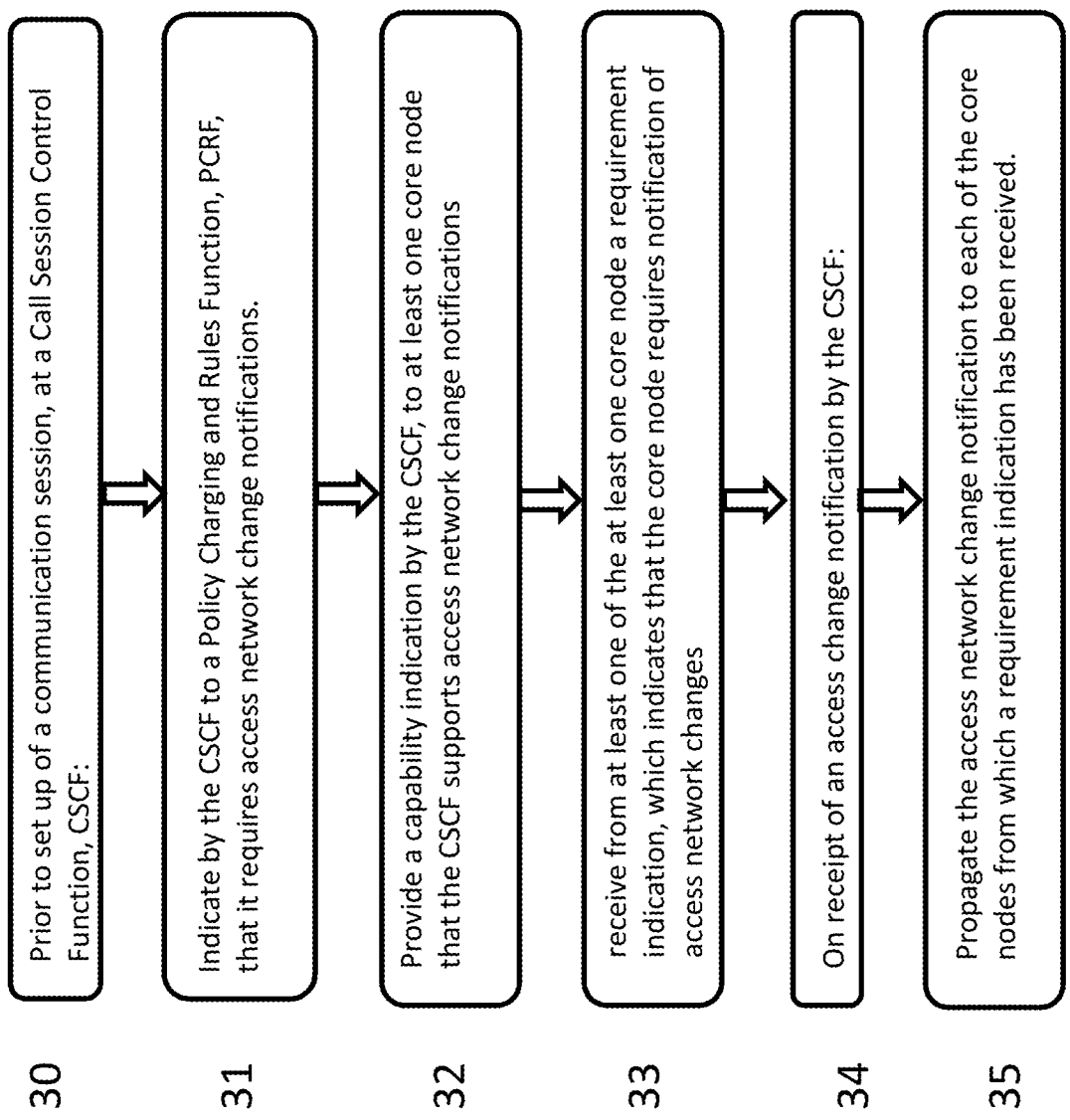
FIG. 2 is a flow chart showing a method of notifying changes in access network according to an embodiment.

The mechanism begins with an indication being sent by the Call Session Control Function that it requires RAT change indications. In an embodiment, this is sent to a Policy Charging and Rules Function, PCRF. The CSCF then advertises its capability to other nodes in the network and those which require indications of RAT change respond with a request for this information to the CSCF. Once these requests have been received, on receiving an indication of RAT change, the CSCF will propagate the indication through the core network to the nodes which have requested it. FIG. 2 is a flow chart illustrating the steps of a method according to an embodiment. At a Call Session Control Function, CSCF, prior to the set-up of a communication session (30), the CSCF indicates (31) to the PCRF that it requires access change notifications. A capability notification is provided (32) by the CSCF to at least one core node that the CSCF supports access change notifications. The CSCF receives (33) from at least one of the at least one core nodes a requirement indication that the core node requires notification of access changes. On receipt (34) of an access change notification, the CSCF propagates (35) the access change notification to each of the core nodes from which a requirement indication has been received.

In an embodiment, when a user equipment registers, the CSCF will indicate in the SIP REGISTER message associated with the registration that it supports access change notifications. In an embodiment, this indication is incorporated by using the Feature-Caps mechanism according to RFC 6809. In an embodiment, the CSCF adds a Feature-Caps header to the SIP REGISTER message. An example of such as header would be "Feature-Caps:*;+g3gpp.access-change-reports="<sip:p-cscf.operator.net>"". This enables other nodes receiving the REGISTER message to know that the CSCF supports the mechanism for propagating RAT change notifications.

In an embodiment, an application server subject to third party registration can, after receiving the registration information with indication of support for RAT change notification, send a SIP SUBSCRIBE message to the indicated CSCF to subscribe to access changes related to the user equipment registration. The CSCF will then store the address of the subscribing node so as to be able to provide RAT change notifications to it.

Figure 3:
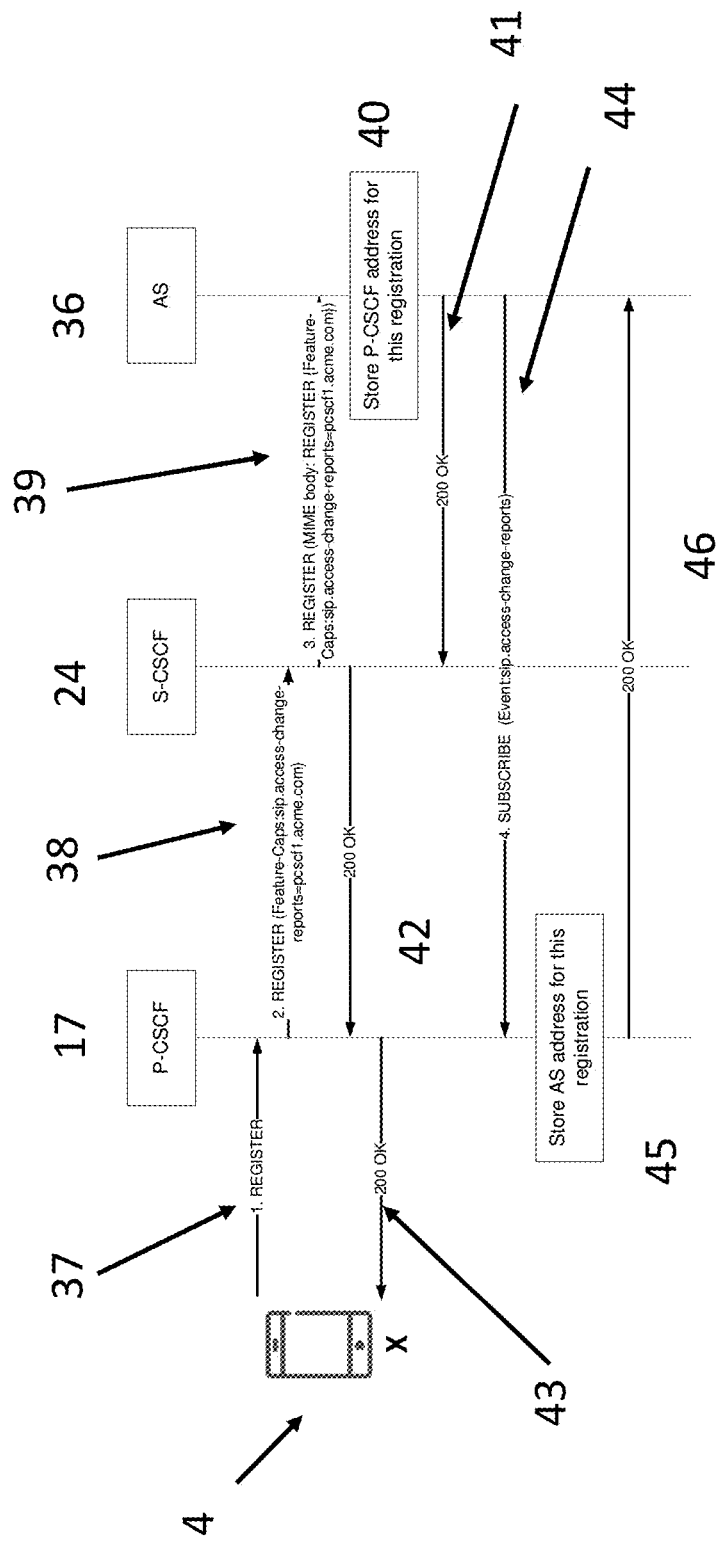
FIG. 3 is a signaling diagram for a method according to an embodiment.

FIG. 3 is a signaling diagram illustrating the signaling between nodes required by the method according to an embodiment. User equipment (4) sends a SIP REGISTER message (37) to the P-CSCF (17), which forwards the message (38) to the S-CSCF (24). In the SIP REGISTER message (38), the P-CSCF will indicate that it supports RAT change notifications. In an embodiment, this is performed using a Feature-caps header according to RFC 6809. The REGISTER message is forwarded (39) to an application server (36). The application server stores (40) the address of the P-CSCF for registration. The application server responds with an OK message (41) to the S-CSCF, which is forwarded (42) to the P-CSCF (17) and hence (43) to the user equipment (4). In order to be able to receive RAT change notifications, the application server (36) sends a SIP SUBSCRIBE message (44) to the P-CSCF (17). The P-CSCF (17) stores (45) the address of the application server (36) and responds with an OK message (46).

When a user equipment moves from LTE to Wi-Fi or into a circuit switched access network, a node subscribing to receive RAT change notifications is notified the change has occurred. In an embodiment, a PDNGW (PGW) notifies the PCRF over the Gx interface that a RAT change has occurred. In an embodiment, the PCRF then notifies the P-CSCF over the Rx interface. The person skilled in the art will appreciate that other arrangements are possible and the invention is not limited to the receipt of RAT change notifications from particular nodes or across particular interfaces.

In an embodiment, P-CSCF correlates the event information with the subscription on access change reports and will in case of an ongoing communication session send a SIP NOTIFY with the RAT change, the dialog identifier and adding an indication about the cause of the notification. The latter can be advantageous e.g. in case of Single Radio Voice Call Continuation (SRVCC) where the change would indicate the PS-leg of the call is dropped. The AS can then include the change in a charging message thus enabling the charging server to e.g. change tariff. The AS uses the event notification to generate a charging event.

Figure 4:
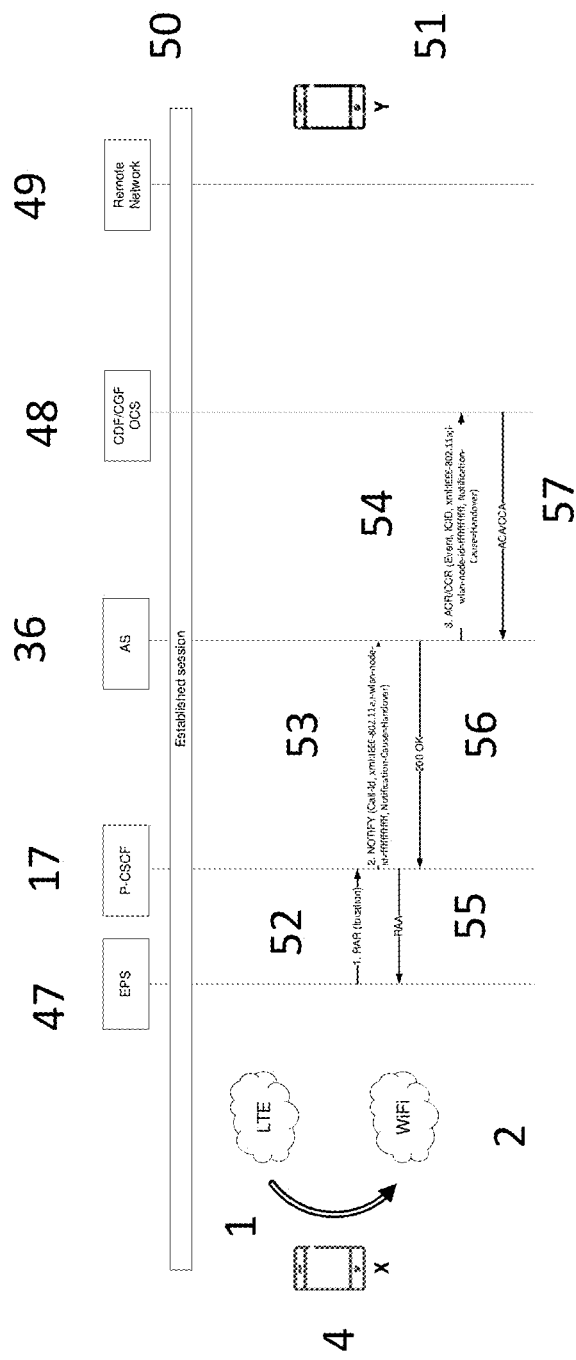
FIG. 4 is a signaling diagram for a method according to an embodiment.

FIG. 4 is a signaling diagram illustrating the signaling required for this method according to an embodiment, when a user equipment changes from LTE to Wi-Fi in an established session (50) between the user equipment (4) and a second user equipment (51) in a remote network (49). A notification (52) from the Evolved Packet System (EPS) (47) is sent to the P-CSCF (17). The P-CSCF (17) sends (53) a SIP NOTIFY message to an application server (36) which has subscribed to the notifications. The notification is then forwarded (54) to a charging function (48), which responds with an OK message (57), which is in turn forwarded (56) to the P-CSCF (17) and then (55) to the EPS (47).

Figure 5:
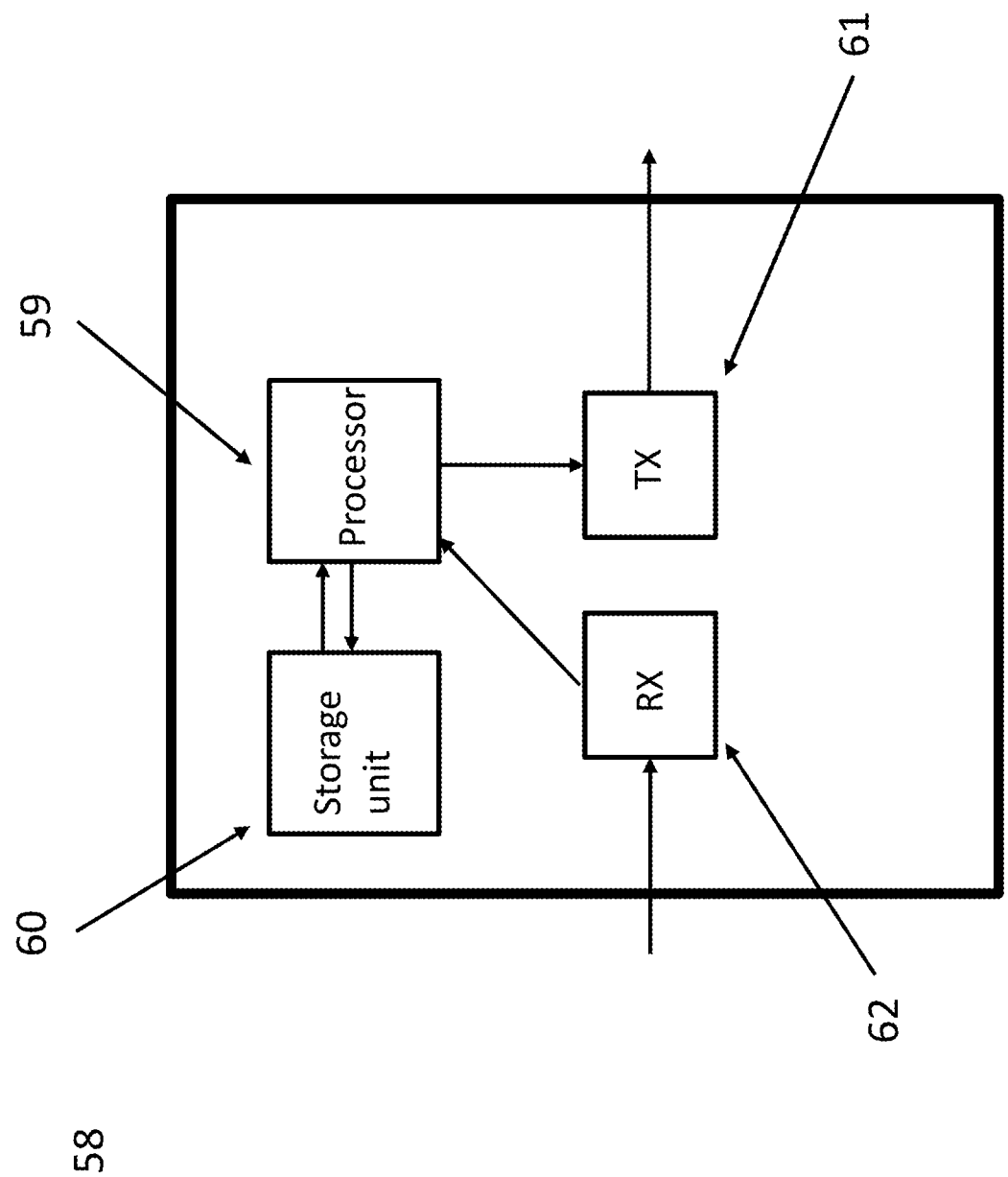
FIG. 5 is a schematic diagram of an apparatus for use in a Call Session Control Function according to an embodiment.

FIG. 5 is a schematic diagram of an apparatus (58) according to an embodiment, for use in a call session control function and comprises processor circuitry (59), a storage unit (60) storing instructions executable by the processor circuitry, a transmitter (61) and a receiver (62). The apparatus is operative, prior to the set-up of a communications session, to indicate to a Policy Charging and Rules Function, PCRF, that the CSCF requires RAT change notifications for a user equipment, to provide a capability indication to one or more network nodes that the CSCF supports RAT change notifications and to receive from the one or more network nodes a requirement indication, which indicates that the network node requires RAT change notifications. The apparatus is further operative, on receipt of a RAT change notification by the CSCF to propagate the RAT change notification to each of the one or more network nodes from which a requirement indication has been received.

Figure 6:
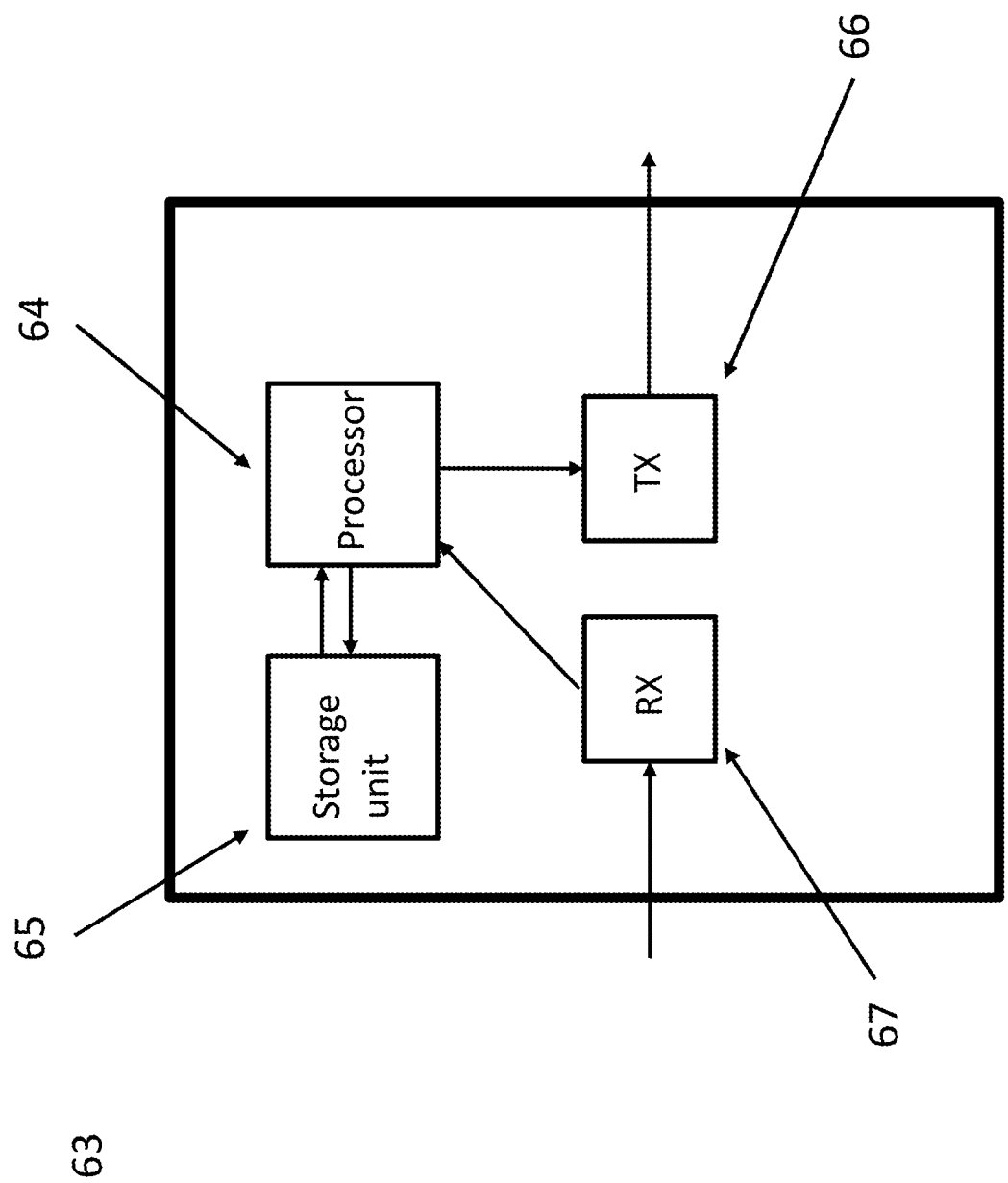
FIG. 6 is a schematic diagram of an apparatus for use in a core network node according to another embodiment.

FIG. 6 is a schematic diagram of an apparatus (63) according to an embodiment, for use in a network node and comprises processor circuitry (64), a storage unit (65) storing instructions executable by the processor circuitry, a transmitter (66) and a receiver (67). The apparatus is operative to receive a capability indication from a Call Session Control Function, CSCF, that the CSCF supports RAT change notifications for a user equipment and provide to the CSCF a requirement indication, which indicates that the network node requires RAT change notifications for the user equipment.

In an alternative embodiment, instead of providing an indication of its support for RAT change notifications at registration, a CSCF may provide an indication at call set-up. In an embodiment, this is performed using a SIP INVITE message. In an embodiment the information may be included as a Feature-Caps header. An example would be "Feature-Caps:*;+g.3gpp.access-change-reports="<sip:p-cscf.operatornet>". In an embodiment, the application server can then respond by inserting its own address into the same type of header, e.g. "Feature-Caps:*;+g.3gpp.access-change-reports="<sip:as.operatornet>"". The corresponding sequence on the terminating side would be that the AS "blindly" indicates its interest for access changes by adding the Feature-Caps header with its own address that a CSCF supporting the feature will store. In an embodiment, the CSCF can use a SIP NOTIFY message to inform the application server that a RAT change has occurred. In another embodiment, a SIP MESSAGE may be used. In yet another embodiment, a SIP INFO message may be used. The person skilled in the art will appreciate that any of these options may be used independently of whether a SIP REGISTER or a SIP INVITE message is used for notification of the capability of the CSCF to notify RAT changes. The invention is not limited to any particular combination of SIP messages.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. An apparatus for use in a Call Session Control Function, CSCF in an IP Multimedia Subsystem, IMS, the apparatus comprising:
   processor circuitry; a storage unit storing instructions executable by said processor circuitry, a transmitter and a receiver, whereby the apparatus is operative to:
   prior to the set-up of a communications session involving a user equipment:
      indicate to a Policy Charging and Rules Function, PCRF, that the CSCF requires RAT change notifications for the user equipment;
      in response to reception of a SIP REGISTER message from the user equipment, include a capability indication that the CSCF supports RAT change notifications in the SIP REGISTER message and forward the SIP REGISTER message to one or more network nodes; and
      receive from the one or more network nodes a SIP SUBSCRIBE message containing a requirement indication, which indicates that the network node requires RAT change notifications associated with the user equipment; and
   on receipt of a RAT change notification for the user equipment by the CSCF from the PCRF during the communications session:
      propagate the RAT change notification for the user equipment using a SIP NOTIFY message to each of the one or more network nodes from which a requirement indication has been received.

2. An apparatus as claimed in claim 1, the apparatus further operative to process a feature-caps mechanism used to convey at least one of the requirement indication, the capability indication or the RAT change notification.

3. A network node comprising an apparatus as claimed in claim 1.

4. A network node as claimed in claim 3, wherein the network node comprises a Proxy Call Session Control Function, P-CSCF.

5. An apparatus as claimed in claim 1, wherein the SIP NOTIFY messages comprises the RAT change notification and an indication of a cause of the RAT change notification.

6. An apparatus as claimed in claim 1, the apparatus is further operative to include a feature-caps header to the SIP REGISTER message, the feature-caps header including the capability indication that the CSCF supports RAT change notifications in the SIP REGISTER message and forward the SIP REGISTER message comprising the feature-caps header to the one or more network nodes.

7. An apparatus as claimed in claim 1, wherein the communications session is one of a Single Radio Voice Call Continuity (SRVCC) communications session or a Dual Radio Voice Call Continuity (DRVCC) communications session.

8. An apparatus for use in a network node in a telecommunications network comprising an IP Multimedia Subsystem, IMS, the apparatus comprising: processor circuitry; a storage unit storing instructions executable by said processor circuitry, a transmitter and a receiver, whereby the apparatus is operative to:
   receive a SIP REGISTER message including a capability indication from a Call Session Control Function, CSCF, that the CSCF supports RAT change notifications for a user equipment; and
   provide to the CSCF a SIP SUBSCRIBE message containing a requirement indication, which indicates that the network node requires RAT change notifications for the user equipment.

9. An apparatus as claimed in claim 8, the apparatus is further operative to perform a network operation in response to receiving a RAT change notification.

10. An apparatus as claimed in claim 9, wherein the network operation is one of altering a charging scheme for the communications session, collecting statistics for the communications session, a service change and a codec change.

11. A network node comprising an apparatus as claimed in claim 8.

12. An apparatus as claimed in claim 8, wherein the network operation comprises changing a codec for a communication session associated with the user equipment.

13. An apparatus as claimed in claim 8, that apparatus is further operative to include a feature-caps header in the SIP SUBSCRIBE message, the feature-caps header comprising an address of the apparatus.

14. A method of notifying changes in Radio Access Technology, RAT, to one or more network nodes in a communications network, comprising an Internet Protocol Multimedia Subsystem, IMS, of a change in Radio Access Technology, RAT, used by a user equipment for a communications session, the method comprising:
   at a Call Session Control Function, CSCF:
      prior to set-up of the communications session involving a user equipment:
         indicating by the CSCF to a Policy Charging and Rules Function, PCRF, that the CSCF requires RAT change notifications for the user equipment;
         in response to reception of a SIP REGISTER message from the user equipment, including a capability indication that the CSCF supports RAT change notifications in the SIP REGISTER message;

forwarding the SIP REGISTER message to one or more network nodes;

receiving from the one or more network nodes a SIP SUBSCRIBE message containing a requirement indication, which indicates that the network node requires RAT change notifications associated with the user equipment;

on receipt of a RAT change notification by the CSCF during the communications session:

propagating the RAT change notification for the user equipment using a SIP NOTIFY message to each of the one or more network nodes from which a requirement indication has been received.

15. A method as claimed in claim 14, wherein the CSCF is a Proxy Call Session Control Function, P-CSCF.

16. A method as claimed in claim 14, further comprising, at a network node, the step of performing a network operation in response to receiving RAT change notification.

17. A method as claimed in claim 16, wherein the network operation is one of altering a charging scheme for the communications session, collecting statistics for the communications session, a service change and a codec change.

18. A method as claimed in claim 14, wherein a feature-caps mechanism is used to convey at least one of the requirement indication, the capability indication or the RAT change notification.

19. A computer program comprised on a non-transitory computer readable storage medium, the computer program comprising instructions which, when executed on at least one processor, cause the at least one processor to carry out a method according to claim 14.

20. A method as claimed in claim 14, wherein the SIP NOTIFY messages comprises the RAT change notification and an indication of a cause of the RAT change notification.

21. A method as claimed in claim 14, further comprising, at a network node, the step of performing a codec change for a communication session associated with the user equipment in response to receiving RAT change notification.

22. A method as claimed in claim 14, wherein including the capability indication that the CSCF supports RAT change notifications in the SIP REGISTER message comprises including a feature-caps header to the SIP REGISTER message, the feature-caps header including the capability indication that the CSCF supports RAT change notifications in the SIP REGISTER message; and wherein forwarding the SIP REGISTER message comprises forwarding the SIP REGISTER message comprising the feature-caps header to the one or more network nodes.

23. A method as claimed in claim 14, further comprising, at a network node, the step of including a feature-caps header in the SIP SUBSCRIBE message, the feature-caps header comprising an address of the apparatus.

24. A method as claimed in claim 14, wherein the communications session is one of a Single Radio Voice Call Continuity (SRVCC) communications session or a Dual Radio Voice Call Continuity (DRVCC) communications session.

\* \* \* \* \*